(12) United States Patent
Sowa et al.

(10) Patent No.: US 10,379,427 B2
(45) Date of Patent: Aug. 13, 2019

(54) PROJECTOR AND METHOD OF DRIVING PROJECTOR

(71) Applicant: SEIKO EPSON CORPORATION, Tokyo (JP)

(72) Inventors: Takeshi Sowa, Matsumoto (JP); Osamu Nakajima, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/140,632

(22) Filed: Sep. 25, 2018

(65) Prior Publication Data
US 2019/0094665 A1   Mar. 28, 2019

(30) Foreign Application Priority Data

Sep. 26, 2017 (JP) ................. 2017-184525
Feb. 26, 2018 (JP) ................. 2018-032462
Apr. 11, 2018 (JP) ................. 2018-076346

(51) Int. Cl.
| | |
|---|---|
| *G03B 21/14* | (2006.01) |
| *H04N 9/31* | (2006.01) |
| *G03B 21/00* | (2006.01) |
| *G02B 27/09* | (2006.01) |
| *G03B 21/20* | (2006.01) |
| *H05B 41/36* | (2006.01) |

(52) U.S. Cl.
CPC ....... *G03B 21/005* (2013.01); *G02B 27/0955* (2013.01); *G03B 21/142* (2013.01); *G03B 21/2026* (2013.01); *G03B 21/2033* (2013.01); *H05B 41/36* (2013.01)

(58) Field of Classification Search
CPC ............... G03B 21/005; G03B 21/142; G03B 21/2033; G03B 21/2026; H05B 41/36; H05B 41/26; H04N 9/31
USPC ........................................... 353/85
See application file for complete search history.

(56) References Cited

U.S. PATENT DOCUMENTS 8,870,387 B2   10/2014   Toyooka et al.
9,152,027 B2 *  10/2015   Terashima ......... G03B 21/2026
(Continued)

FOREIGN PATENT DOCUMENTS

| JP | 2003-156798 A | 5/2003 |
|---|---|---|
| JP | 2006-154808 A | 6/2006 |

(Continued)

*Primary Examiner* — William C. Dowling
(74) *Attorney, Agent, or Firm* — Oliff PLC

(57) ABSTRACT

A projector includes a light source, light modulation device, first driver, and second driver. The first driver is configured to drive the light modulation device to alternately provide a first polarity period and a second polarity period. The second driver is configured to drive the light source so that timings of switching related to a drive current coincide between the first polarity period and the second polarity period. The timings of switching are different from each other between a first period and a second period. The first period contains one first polarity period and one second polarity period adjacent to the one first polarity period. The second period is adjacent to the first period and contains another first polarity period than the one first polarity period and another second polarity period than the one second polarity period. The another second polarity period is adjacent to the another first polarity period.

7 Claims, 11 Drawing Sheets

(56) References Cited

U.S. PATENT DOCUMENTS

| | | | |
|---|---|---|---|
| 9,380,686 B2* | 6/2016 | Samejima | H05B 41/2887 |
| 2007/0103421 A1 | 5/2007 | Sekine et al. | |
| 2008/0137041 A1* | 6/2008 | Okamoto | H05B 41/2887 |
| | | | 353/85 |
| 2012/0044466 A1* | 2/2012 | Sato | G03B 21/2026 |
| | | | 353/85 |
| 2012/0099084 A1 | 4/2012 | Toyooka et al. | |
| 2014/0036240 A1* | 2/2014 | Samejima | H05B 41/36 |
| | | | 353/85 |
| 2017/0237954 A1* | 8/2017 | Yamada | G03B 21/2026 |
| | | | 353/85 |

FOREIGN PATENT DOCUMENTS

| | | |
|---|---|---|
| JP | 2009-198886 A | 9/2009 |
| JP | 2012-88546 A | 5/2012 |
| JP | 2012-89454 A | 5/2012 |

* cited by examiner

PROJECTOR AND METHOD OF DRIVING PROJECTOR

BACKGROUND

1. Technical Field

The present invention relates to a projector and a method of driving the projector.

2. Related Art

In projectors of related art, there is a problem that horizontal-striped unevenness of brightness is generated in a projected image due to a relationship between variations in luminance of a light source and a drive system of a light modulation device. To address the problem, Patent Document 1 (JP-A-2009-198886) discloses a liquid crystal projector including a liquid crystal panel, a control unit that outputs a vertical synchronizing signal of the liquid crystal panel, a lamp, a lamp current generation unit that generates a lamp current having a current value increasing in a predetermined pulse period according to an input timing of the vertical synchronizing signal, and a picture correction unit that reduces a predetermined amount of luminance of a picture signal in the predetermined pulse period according to the input timing of the vertical synchronizing signal. According to the liquid crystal projector, generation of flicker is suppressed because the pulse period is provided and the luminance of the picture signal is reduced in the predetermined pulse period, and thereby, generation of horizontal-shaped noise may be prevented.

However, in the liquid crystal projector of Patent Document 1, image processing is performed after the vertical synchronizing signal and the input picture signal are synchronized in addition to the synchronization of the vertical synchronizing signal and the lamp current, and there is a problem of complicated control. Further, the pulse is provided after a predetermined time from the vertical synchronizing signal, and there is a problem that the horizontal-striped unevenness of brightness is left in the same position on the picture even when the illuminance increase of the lamp is cancelled out by the luminance decrease of the input picture signal.

SUMMARY

An advantage of some aspects of the invention is to provide a projector with which visual recognition of horizontal-striped unevenness of brightness is harder. Another advantage of some aspects of the invention is to provide a method of driving the projector with which visual recognition of horizontal-striped unevenness of brightness is harder.

A projector according to an aspect of the invention includes a light source configured to emit light, a light modulation device configured to modulate the light emitted from the light source according to an image signal, a projection optical device configured to project the light modulated by the light modulation device, a first driver configured to apply a voltage to the light modulation device and drive the light modulation device, the voltage having polarity inverted according to a predetermined drive frequency, and a second driver configured to supply a drive current to the light source and drive the light source in synchronization with the predetermined drive frequency. The first driver is configured to drive the light modulation device to alternately provide a first polarity period in which the polarity of the voltage is first polarity and a second polarity period in which the polarity of the voltage is second polarity different from the first polarity. The second driver is configured to drive the light source so that timings of switching related to the drive current coincide between the first polarity period and the second polarity period adjacent to the first polarity period. The timings of switching are different from each other between a first period and a second period, the first period containing one first polarity period and one second polarity period adjacent to the one first polarity period, the second period being adjacent to the first period, and the second period containing another first polarity period than the one first polarity period and another second polarity period than the one second polarity period, the another second polarity period being adjacent to the another first polarity period.

In the light modulation device of the projector, luminance information of pixels are sequentially written with respect to each horizontal line. Here, in the case of employing a drive system of applying a voltage having polarity inverted with respect to each vertical synchronizing period to the light modulation device (field inversion drive system), the following problem arises. For example, it is assumed that luminance of the light source is lower in a part of one vertical synchronizing period in a + field in which a positive voltage is applied to the respective pixels of the light modulation device.

In the period with the lower luminance, photo leakage of switching elements provided in the respective pixels is smaller, and, in the horizontal line in which writing operation is performed in the period, deviations from the luminance set for the respective pixels are smaller. On the other hand, in the period without the lower luminance, photo leakage of switching elements provided in the respective pixels is larger, and, in the horizontal line in which writing operation is performed in the period, deviations from the luminance set for the respective pixels are larger. Due to the difference, a difference in brightness is generated between the horizontal line with the lower luminance of the light source and the horizontal line without the lower luminance in the period in which writing operation is performed and streaky unevenness appears on the screen.

The similar phenomenon occurs in a − field in which a negative voltage is applied to the respective pixels, however, the brightness change of the horizontal line written with the lower luminance is opposite to that in the case of the + field. For example, in the + field, the horizontal line written with the lower luminance becomes a lighter streak than the other horizontal lines, and, in the − field, the horizontal line written with the lower luminance becomes a darker streak than the other horizontal lines. Note that whether the horizontal line becomes the lighter streak or the darker streak depends on the design of the light modulation device, and the reversal of light and dark remains in the + field and the − field.

In the projector according to the aspect of the invention, the timings of switching relating to the drive current coincide between the first polarity period and the second polarity period temporally adjacent to each other, and thus, the bright streak and the dark streak are cancelled out each other in the horizontal lines in the same location on the screen and the streak becomes pale. Further, the timings of switching relating to the drive current are different from each other between the first period and the second period being temporally adjacent to each other and respectively having the first polarity period and the second polarity period, and thus, the position of the pale residual streak is changed. Thereby, according to the projector of the aspect of the invention, recognition of streaky unevenness of the image by a user may be made harder.

In the projector according to the aspect of the invention, the light source may be a solid-state light source, and the switching may be switching of on/off in pulse width modulation (PWM) drive of the drive current supplied to the solid-state light source.

According to this configuration, the invention may be applied to the projector using the solid-state light source such as a semiconductor laser.

In the projector according to the aspect of the invention, phase of the drive current in the second period may be shifted from phase of the drive current in the first period by 180 degrees.

According to this configuration, the streaky unevenness in the first period and the streaky unevenness in the second period are cancelled out each other at least in a partial area on the screen, and recognition of the streaky unevenness may be made harder.

In the projector according to the aspect of the invention, a duty ratio of on/off in the pulse width modulation drive of the drive current may be 50%.

According to this configuration, the phase of the drive current in the first period and the phase of the drive current in the second period are different by 180 degrees and the duty ratio is 50%, and thus, the streaky unevenness in the first period and the streaky unevenness in the second period are cancelled out each other in the nearly entire area on the screen. Thereby, the recognition of the streaky unevenness may be made harder most effectively.

In the projector according to the aspect of the invention, the second driver may synchronize a start of the one first polarity period and a switching in the drive current in the first period and synchronize a start of the another first polarity period and a switching in the drive current in the second period, and one switching of the switching of synchronization with the start of the one first polarity period and the switching of synchronization with the start of the another first polarity period may be a switching from on to off in the pulse width modulation drive, and the other switching may be a switching from off to on in the pulse width modulation drive.

According to this configuration, the phase of the drive current in the first period and the phase of the drive current in the second period may be made different, and thus, the streaky unevenness in the first period and the streaky unevenness in the second period are cancelled out each other at least in a partial area on the screen. Thereby, the recognition of the streaky unevenness may be made harder.

In the projector according to the aspect of the invention, the light source may be a discharge lamp, and the switching may be polarity inversion of an alternating current supplied to the discharge lamp.

According to this configuration, the invention may be applied to the projector using the discharge lamp.

A method of driving a projector according to an aspect of the invention is a method of driving a projector including a light source configured to emit light, and a light modulation device configured to modulate the light emitted from the light source according to an image signal, including applying a voltage to the light modulation device, the voltage having polarity inverted according to a predetermined drive frequency, driving the light modulation device, and supplying a drive current to the light source and driving the light source in synchronization with the predetermined drive frequency, providing a first polarity period in which the polarity of the voltage is first polarity and a second polarity period in which the polarity of the voltage is second polarity different from the first polarity are alternately provided and driving the light modulation device, and driving the light source so that timings of switching related to the drive current coincide between the first polarity period and the second polarity period adjacent to the first polarity period, wherein the timings of switching are different from each other between a first period and a second period, the first period containing one first polarity period and one second polarity period adjacent to the one first polarity period, the second period being adjacent to the first period, and the second period containing another first polarity period than the one first polarity period and another second polarity period than the one second polarity period, the another second polarity period being adjacent to the another first polarity period.

In the method of driving the projector according to the aspect of the invention, the timings of switching relating to the drive current coincide between the first polarity period and the second polarity period temporally adjacent to each other, and thus, the bright streak and the dark streak are cancelled out each other in the horizontal lines in the same location on the screen and the streak becomes pale. Further, the timings of switching relating to the drive current are different from each other between the first period and the second period being temporally adjacent to each other and respectively having the first polarity period and the second polarity period, and thus, the position of the pale residual streak is changed. Thereby, recognition of streaky unevenness of the image by the user may be made harder.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

As below, a first embodiment of the invention will be explained using FIGS. 1 to 5.

A projector of the embodiment is an example of a projection-type image display apparatus that displays a color image on a screen (projected surface).

Note that, in the following respective drawings, for visibility of the respective component elements, scaling of dimensions may be made different depending on the component elements.

Figure 1:
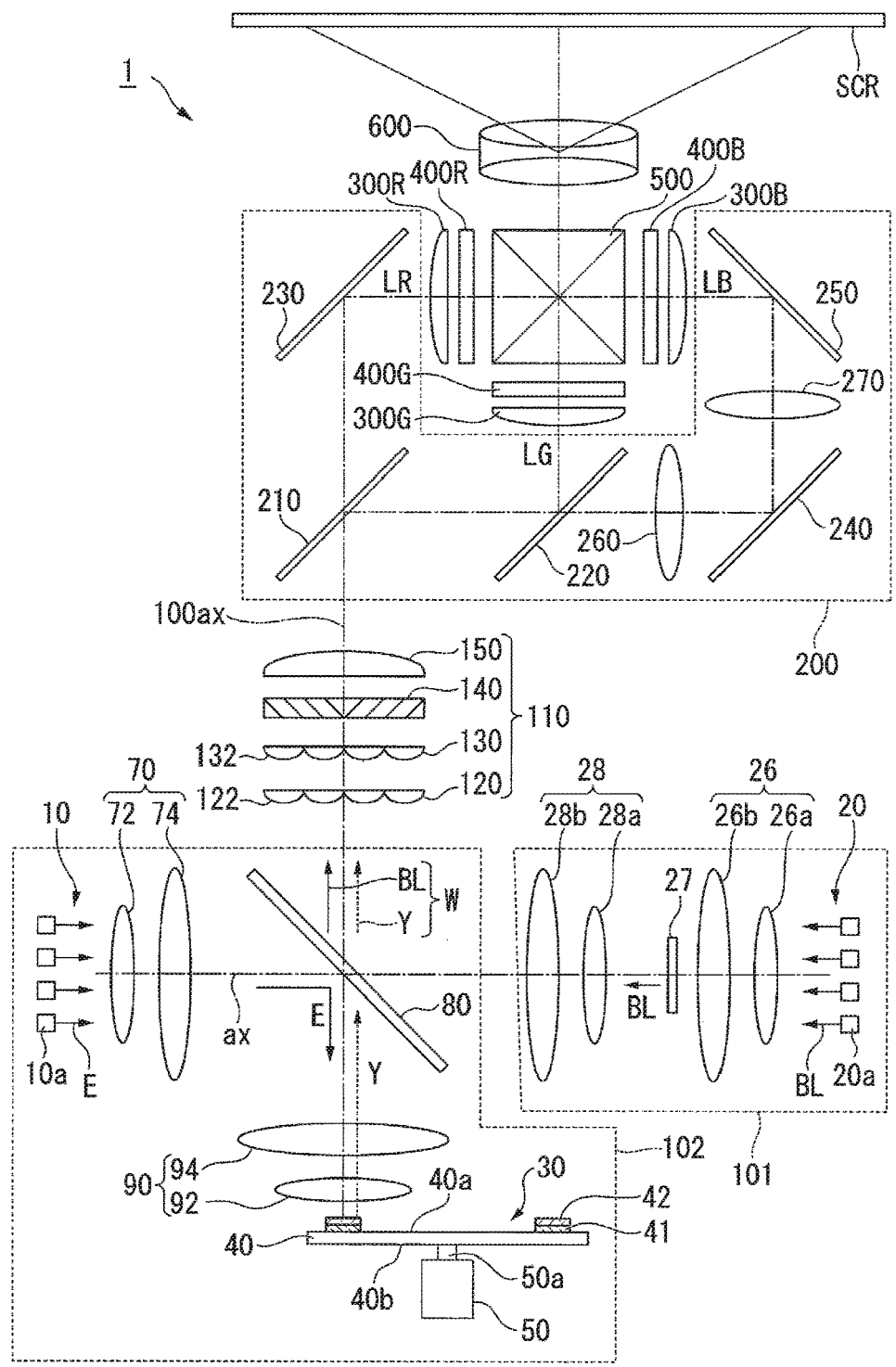
FIG. 1 is a schematic configuration diagram of a projector of a first embodiment of the invention.

FIG. 1 is a schematic configuration diagram of an optical system of a projector 1 of the embodiment.

As shown in FIG. 1, the projector 1 includes a first light source unit 101, a second light source unit 102, a uniform illumination system 110, a color separation and light guiding system 200, a light modulation device 400R, a light modulation device 400G, and a light modulation device 400B corresponding to respective color lights of red light, green light, and blue light, a cross dichroic prism 500, and a projection optical device 600.

The first light source unit 101 includes a first light source 20, a collecting system 26, a diffuser plate 27, and collimating system 28.

The first light source 20 includes a plurality of semiconductor laser elements 20a as solid-state light sources. The semiconductor laser element 20a outputs a blue light BL having a peak wavelength of light emission intensity of e.g. 460 nm. The first light source 20 may include only one semiconductor laser element 20a. Or, a semiconductor laser element that outputs a blue light having another peak wavelength than 460 nm may be used for the first light source 20. The semiconductor laser element 20a may output a blue light BL having a peak wavelength of light emission intensity of e.g. 430 nm to 480 nm.

In the first light source 20, luminance of the output light is adjusted by pulse width modulation (PWM) control of the semiconductor laser element 20a. In the PWM control, lighting and extinction of the semiconductor laser element 20a are cyclically switched and the ratio between the lighting time (on-time) and the extinction time (off-time) is changed, and thereby, the luminance is adjusted. Hereinafter, the ratio between the lighting time and the extinction time of the semiconductor laser element 20a is referred to as "duty ratio".

The collecting system 26 includes a first lens 26a and a second lens 26b. The collecting system 26 collects the blue light output from the first light source 20 onto the diffuser plate 27 or a vicinity thereof. The first lens 26a and the second lens 26b include convex lenses.

The diffuser plate 27 diffuses and converts the blue light BL output from the first light source 20 into a blue light BL having an intensity distribution close to the intensity distribution of a fluorescent light Y output from a wavelength conversion element 30, which will be described later. As the diffuser plate 27, e.g. ground glass made of optical glass may be used.

The collimating system 28 includes a first lens 28a and a second lens 28b. The collimating system 28 nearly parallelizes the light output from the diffuser plate 27. The first lens 28a and the second lens 28b include convex lenses.

The second light source unit 102 includes a second light source 10, a collimating system 70, a dichroic mirror 80, a collimating and collecting system 90, and the wavelength conversion element 30.

The second light source 10 includes a plurality of semiconductor laser elements 10a. The semiconductor laser element 10a outputs a blue light E having a peak wavelength of light emission intensity of e.g. 445 nm. The second light source 10 may include only one semiconductor laser element 10a. Or, a semiconductor laser element that outputs a blue light having another peak wavelength than 445 nm may be used for the second light source 10. The semiconductor laser element 10a may output a blue light E having a peak wavelength of light emission intensity of e.g. 430 nm to 480 nm.

In the second light source 10, like the first light source 20, luminance is adjusted by PWM control of the semiconductor laser element 10a. Further, the second light source 10 is placed so that an optical axis ax may be orthogonal to an illumination light axis 100ax.

The collimating system 70 includes a first lens 72 and a second lens 74. The collimating system 70 nearly parallelizes the blue light E output from the second light source 10. The first lens 72 and the second lens 74 include convex lenses.

The dichroic mirror 80 is placed in the optical path from the collimating system 70 to the collimating and collecting system 90, which will be described later, to respectively cross the optical axis ax of the second light source 10 and the illumination light axis 100ax at angles of 45°. The dichroic mirror 80 reflects the blue light BL and the blue light E and transmits the yellow fluorescent light Y containing the red light and the green light.

The collimating and collecting system 90 includes a first lens 92 and a second lens 94. The collimating and collecting system 90 substantially collects and enters the blue light E reflected by the dichroic mirror 80 into a fluorescent material element 42 of the wavelength conversion element 30, which will be described later, and thereby, nearly parallelizes the fluorescent light Y output from the wavelength conversion element 30. The first lens 92 and the second lens 94 include convex lenses.

The wavelength conversion element 30 includes a circular disc 40, a reflection film 41, the fluorescent material element 42, and a motor 50. The circular disc 40 is rotatable by the motor 50. The fluorescent material element 42 is provided in an annular shape along the circumferential direction on an upper surface 40a of the circular disc 40. The motor 50 is placed on the side of a lower surface 40b of the circular disc 40 and a rotation shaft 50a is connected to the circular disc 40.

The fluorescent material element 42 converts the blue light E output from the second light source 10 into the fluorescent light Y in a wavelength range e.g. from 520 nm to 580 nm. The fluorescent light Y is the yellow light containing the red light and the green light. An antireflection film (not shown) for preventing the reflection of the blue light E is provided on the surface of the fluorescent material element 42.

The blue light E of a laser beam enters the fluorescent material element 42, and thereby, heat is generated and the function of the fluorescent material element 42 becomes lower. In the embodiment, the incident position of the blue light E on the fluorescent material element 42 is sequentially changed by rotation of the circular disc 40. Thereby, deterioration of the fluorescent material element 42 is prevented because of the blue light BL concentrically applied to the same location of the fluorescent material element 42.

In the embodiment, e.g. a ceramic fluorescent layer is used as the fluorescent material element 42, and thereby, the temperature rise of the fluorescent material element 42 is suppressed and a failure in light emission called temperature quenching is suppressed. The fluorescent material element 42 is e.g. a bulk YAG fluorescent material of e.g. $(Y,Gd)_3(Al,Ga)_5O_{12}Ce$. Thereby, higher light emission efficiency of the fluorescent light Y may be obtained.

The blue light BL output from the first light source 20 is reflected by the dichroic mirror 80, and then, combined with the yellow fluorescent light Y output from the wavelength conversion element 30 and transmitted through the dichroic mirror 80 into white light W. The white light W enters the uniform illumination system 110.

The uniform illumination system 110 includes a first lens array 120, a second lens array 130, a polarization conversion element 140, and a superimposing lens 150.

The first lens array 120 has a plurality of first lenses 122 for dividing the light output from the dichroic mirror 80 into a plurality of partial luminous fluxes. The plurality of first lenses 122 are arranged in a matrix form within a plane orthogonal to the illumination light axis 100$ax$.

The second lens array 130 includes a plurality of second lenses 132 corresponding to the plurality of first lenses 122 of the first lens array 120. The second lens array 130 forms images of the respective first lenses 122 of the first lens array 120 in the vicinities of image formation areas of the respective light modulation devices 400R, 400G, 400B with the superimposing lens 150. The plurality of second lenses 132 are arranged in a matrix form within a plane orthogonal to the illumination light axis 100$ax$.

The polarization conversion element 140 converts the respective partial luminous fluxes divided by the first lens array 120 into linearly-polarized lights. The polarization conversion element 140 has a polarization separation layer, a reflection layer, and a retardation layer (not shown). The polarization separation layer transmits one linearly-polarized light component of the polarized light components contained in the light from the wavelength conversion element 30 without change and reflects the other linearly-polarized light component toward the reflection layer. The reflection layer reflects the other linearly-polarized light component reflected by the polarization separation layer in a direction parallel to the illumination light axis 100$ax$. The retardation layer converts the other linearly-polarized light component reflected by the reflection layer into the one linearly-polarized light component.

The superimposing lens 150 collects and superimposes the respective partial luminous fluxes from the polarization conversion element 140 on one another in the vicinities of the image formation areas of the light modulation device 400R, the light modulation device 400G, and the light modulation device 400B. The first lens array 120, the second lens array 130, and the superimposing lens 150 form an optical integration system that makes the in-plane light intensity distribution of the light output from the wavelength conversion element 30 uniform.

The color separation and light guiding system 200 includes a dichroic mirror 210, a dichroic mirror 220, a reflection mirror 230, a reflection mirror 240, a reflection mirror 250, a relay lens 260, and a relay lens 270. The color separation and light guiding system 200 separates the white light W into the red light LR, the green light LG, and the blue light LB, and guides the red light LR, the green light LG, and the blue light LB to the corresponding light modulation device 400R, light modulation device 400G, and light modulation device 400B, respectively.

A field lens 300R is placed between the color separation and light guiding system 200 and the light modulation device 400R. A field lens 300G is placed between the color separation and light guiding system 200 and the light modulation device 400G. A field lens 300B is placed between the color separation and light guiding system 200 and the light modulation device 400B.

Note that, in the embodiment, the red light LR corresponds to a light in a wavelength range from 620 nm to 810 nm. The green light LG corresponds to a light in a wavelength range from 480 nm to 520 nm. The blue light LB corresponds to a light in a wavelength range from 430 nm to 480 nm.

The dichroic mirror 210 transmits the red light component and reflects the green light component and the blue light component. The dichroic mirror 220 reflects the green light component and transmits the blue light component. The reflection mirror 230 reflects the red light component. The reflection mirror 240 and the reflection mirror 250 reflect the blue light component.

The red light transmitted through the dichroic mirror 210 is reflected by the reflection mirror 230, transmitted through the field lens 300R, and enters the image formation area of the light modulation device for red light 400R. The green light reflected by the dichroic mirror 210 is further reflected by the dichroic mirror 220, transmitted through the field lens 300G, and enters the image formation area of the light modulation device for green light 400G. The blue light transmitted through the dichroic mirror 220 enters the image formation area of the light modulation device for blue light 400B through the relay lens 260, the reflection mirror 240, the relay lens 270, the reflection mirror 250, and the field lens 300B.

The respective light modulation device 400R, light modulation devices 400G, and light modulation device 400B include liquid crystal panels. These respective light modulation devices 400R, 400G, 400B modulate the incident color lights according to image information and form images corresponding to the respective color lights. Note that light incident-side polarizers (not shown) are respectively placed between the respective field lens 300R, field lens 300G, field lens 300B and the respective light modulation device 400R, light modulation device 400G, and light modulation device 400B. Light exiting-side polarizers (not shown) are respectively placed between the respective light modulation device 400R, light modulation device 400G, and light modulation device 400B and the cross dichroic prism 500.

The cross dichroic prism 500 combines the respective image lights output from the respective light modulation device 400R, light modulation device 400G, and light modulation device 400B. The cross dichroic prism 500 has a nearly square shape in the plan view formed by bonding of four rectangular prisms and dielectric multilayer films are formed on the interfaces in a nearly X-shape on which the rectangular prisms are bonded.

The image lights output from the cross dichroic prism 500 are enlarged and projected by the projection optical device 600 and form an image on the screen SCR. That is, the projection optical device 600 projects the lights modulated by the respective light modulation device 400R, light modulation device 400G, and light modulation device 400B onto the screen SCR.

Next, an electrical configuration of the projector 1 will be explained.

Figure 2:
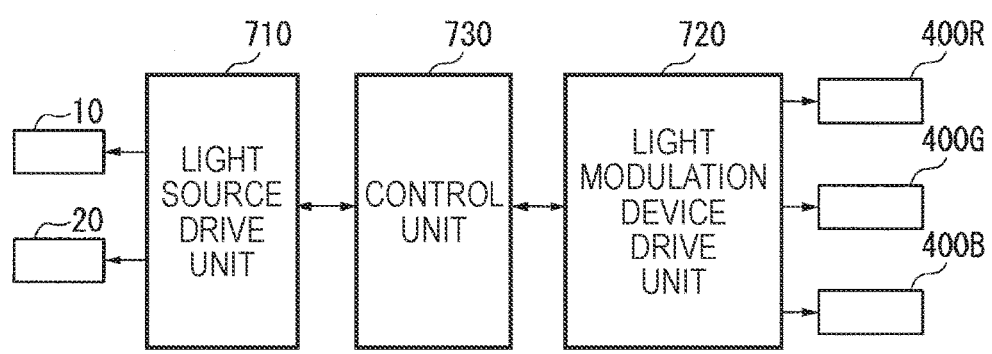
FIG. 2 is a block diagram of the projector.

FIG. 2 is a block diagram showing the electrical configuration of the projector 1.

As shown in FIG. 2, the projector 1 further includes a light source driver 710, a light modulation device driver 720, and a control unit 730.

The light source driver 710 supplies a drive current to the first light source 20 and the second light source 10 to respectively drive the first light source 20 and the second light source 10. The light modulation device driver 720 applies a voltage having polarity inverting according to a predetermined drive frequency to the respective light modulation device 400R, light modulation device 400G, and light modulation device 400B to drive the light modulation device 400R, the light modulation device 400G, and the light modulation device 400B. The light source driver 710 drives the first light source 20 and the second light source 10 in synchronization with the predetermined drive frequency at which the respective light modulation devices are driven. The control unit 730 controls the respective parts of the light source driver 710, the light modulation device driver 720, and the projector 1.

The light modulation device driver 720 of the embodiment corresponds to a first driver in the appended claims. The light source driver 710 of the embodiment corresponds to a second driver in the appended claims.

As below, a method of driving the projector 1 will be explained.

Figure 3:
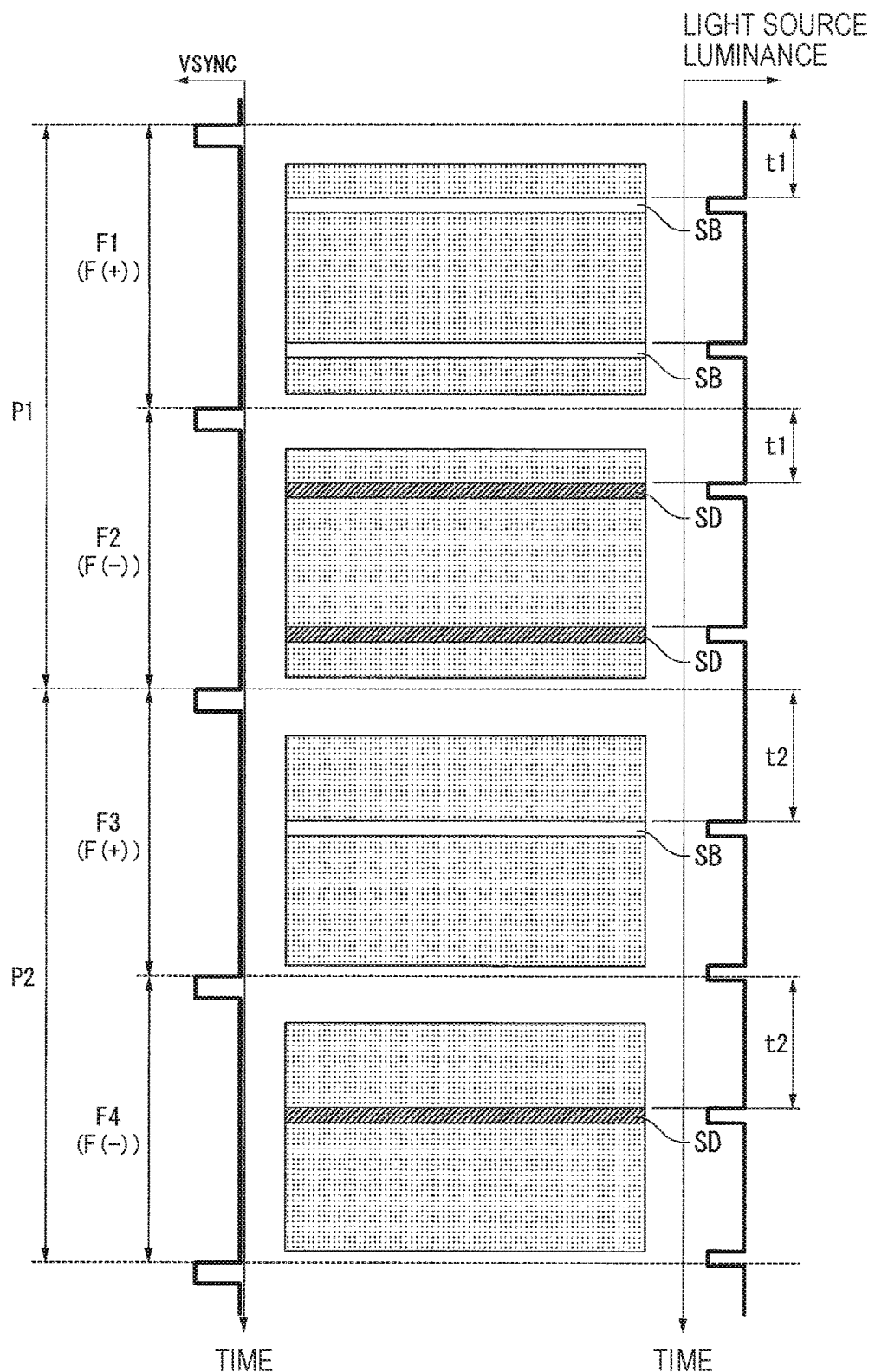
FIG. 3 is a diagram for explanation of a method of driving the projector.

FIG. 3 is a diagram for explanation of the method of driving the projector 1. In FIG. 3, the longitudinal axes indicate time and the waveform on the left indicates a waveform of a vertical synchronizing signal Vsync. The graph on the right indicates changes of luminance (brightness) of the first light source 20 and the second light source 10. In the embodiment, the changes of luminance (brightness) of the first light source 20 and the second light source 10 correspond to changes of the drive current supplied to the first light source 20 and the second light source 10 and, more specifically, correspond to switching relating to the drive current supplied to the first light source 20 and the second light source 10. In the embodiment, the switching relating to the drive current is switching on/off in the pulse width modulation drive of the drive current supplied to the first light source 20 and the second light source 10. That is, in a period in which the luminance of the first light source 20 and the second light source 10 is lower, the value of the drive current is smaller, and, in a period in which the luminance of the first light source 20 and the second light source 10 is higher, the value of the drive current is larger. The rectangular drawings at the center show images of streaky unevenness projected on the projected surface on the screen.

The projector and the method of driving the projector according to the invention can be applied to a projector having a discharge lamp such as an ultrahigh pressure mercury lamp as a light source. In this case, the graph on the right in FIG. 3 indicates changes of luminance (brightness) of the discharge lamp. Further, the changes of luminance (brightness) of the discharge lamp, i.e., switching relating to the drive currents corresponds to polarization inversion of an alternating current supplied to the discharge lamp.

In the embodiment, in the light modulation devices 400R, 400G, 400B, luminance information is sequentially written with respect to each horizontal line in the respective pixels in the image formation areas. Further, as the drive system of the respective light modulation devices in the embodiment, drive of applying the voltage having polarity inverted with respect to each vertical synchronizing period to the respective pixel electrodes of the light modulation devices 400R, 400G, 400B, so-called field inversion drive is employed.

Figure 4:
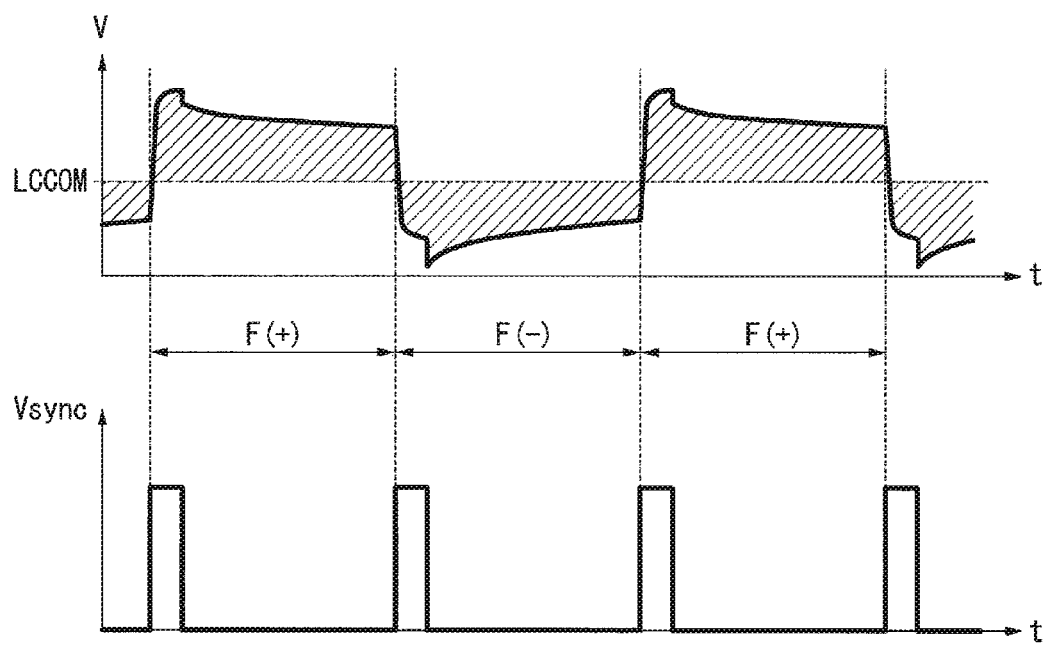
FIG. 4 is a diagram for explanation of a concept of field inversion drive.

FIG. 4 is a diagram for explanation of a concept of the field inversion drive. The upper drawing in FIG. 4 shows an example of the waveform of the voltage supplied to the light modulation devices 400R, 400G, 400B. The lower drawing in FIG. 4 shows an example of the waveform of the vertical synchronizing signal Vsync supplied to the light modulation device driver 720 that drive the light modulation devices 400R, 400G, 400B.

As shown in FIG. 4, the voltage supplied to the light modulation devices 400R, 400G, 400B has polarity inverted with respect to each vertical synchronizing period with reference to a common potential LCCOM.

As shown in FIG. 4, the light modulation device driver 720 applies the voltage having polarity inverted with respect to each predetermined vertical synchronizing period to the respective light modulation devices 400R, 400G, 400B according to the predetermined drive frequency and alternately provides a first polarity period F (+) in which the polarity of the voltage is first polarity (positive) and a second polarity period F (−) in which the polarity of the voltage is second polarity (negative) different from the first polarity as predetermined vertical synchronizing periods to respectively drive the light modulation devices 400R, 400G, 400B.

Note that, in the following explanation, the first polarity period F (+) in which the polarity of the voltage applied to the respective light modulation devices is positive may be referred to as "+ field period" and the second polarity period F (−) in which the polarity of the voltage applied to the respective light modulation devices is negative may be referred to as "− field period".

FIG. 3 shows the four vertical synchronizing periods, and these vertical synchronizing periods are referred to as "first field period F1", "second field period F2", "third field period F3", "fourth field period F4" in the order in which the time of the longitudinal axis is smaller. In the example, the first field period F1 and the third field period F3 are + field periods F(+) in which the positive voltage is applied to the respective pixel electrodes of the light modulation devices 400R, 400G, 400B. The second field period F2 and the fourth field period F4 are − field periods F(−) in which the negative voltage is applied to the respective pixel electrodes of the light modulation devices 400R, 400G, 400B. In the embodiment, the drive frequency of the light modulation devices 400R, 400G, 400B is 60 Hz, and the length of the single vertical synchronizing period is about 16.7 msec. The drive frequency of the light modulation devices 400R, 400G, 400B is a frequency (refresh rate) at which luminance information is written in the respective pixels of the light modulation devices 400R, 400G, 400B.

When light is applied to the liquid crystal panels forming the light modulation devices 400R, 400G, 400B, a leakage current is generated in the thin-film transistor (TFT) as a switching element provided in the pixel. In the specification, the phenomenon is referred to as "photo leakage". In either the + field period F(+) or − field period F(−), the photo leakage acts in a direction in which electric charge of the pixel capacitance leaks, i.e., a direction in which the hold voltage is lower.

Therefore, when the light source luminance varies, in the + field period F(+), in the pixel in the horizontal line in which luminance information is written with the higher light source luminance, the leakage of the electric charge of the pixel capacitance is larger and the pixel potential becomes closer to the common potential LCCOM. That is, the effective voltage applied to the liquid crystal in the pixel of the horizontal line is lower than the effective voltages in the pixels of the other horizontal lines. As a result, the horizontal line is displayed more darkly than the other horizontal lines in which luminance information is written with the lower light source luminance.

On the other hand, in the − field period F(−), in the pixel in the horizontal line in which luminance information is written with the higher light source luminance, the leakage of the electric charge of the pixel capacitance is larger and the pixel potential becomes farther from the common potential LCCOM. That is, the effective voltage applied to the liquid crystal in the pixel of the horizontal line is higher than the effective voltages in the pixels of the other horizontal lines. As a result, the horizontal line is displayed more lightly than the other horizontal lines in which luminance information is written with the lower light source luminance.

Note that, in the case where the light modulation devices 400R, 400G, 400B perform display in the normally black mode, the horizontal line in which luminance information is written with the higher light source luminance is displayed more darkly in the + field period F(+) and the horizontal line in which luminance information is written with the higher light source luminance is displayed more lightly in the − field period F(−) as described above. In the case where the light modulation devices 400R, 400G, 400B perform display in the normally white mode, the above described relationship between light and dark is reversed. However, the reversal of the display state between the lighter display and the darker display of the horizontal line in which luminance information is written with the higher light source luminance between the + field period F(+) and the − field period F(−) is common with both modes.

In the embodiment, as shown in FIG. 3, the light source driver 710 supplies the drive current having the waveform in which periods with lower light source luminance (periods with the smaller drive current value) are provided in pulses to the first light source 20 and the second light source 10. Therefore, of the single field period, the light source luminance is higher in most of the period and the light source luminance is lower in the rest short period. Accordingly, in the first field period F1 and the third field period F3 as the + field periods F(+), bright streaks SB are generated in the images with predetermined brightness. Contrary, in the the second field period F2 and the fourth field period F4 as the − field periods F(−), dark streaks SD are generated in the images with predetermined brightness.

Hereinafter, the time from the rise of the pulse of the vertical synchronizing signal Vsync to the start of the variation of the light source luminance (the fall of the light source luminance) is referred to as "luminance variation start time". In FIG. 3, signs t1, t2 are the luminance variation start times. The luminance variation start time in the first field period F1 and the luminance variation start time in the second field period F2 having lengths t1 are the same. That is, the light source driver 710 drives the first light source 20 and the second light source 10 so that the timings of switching relating to the drive current may coincide between the first polarity period F(+) and the second polarity period F(−) adjacent to the first polarity period F(+). Therefore, the positions in which the bright streaks SB of the first field period F1 are generated within the screen and the positions in which the dark streaks SD of the second field period F2 are generated within the screen coincide within the screen.

On the basis of the frequency response characteristics of the human eye, when the brightness of the pixel changes at the frequency higher than about 50 Hz as a visible frequency, recognition as the brightness change of the pixel is harder, but recognition as a pixel having average brightness is made by the user.

Figure 5:
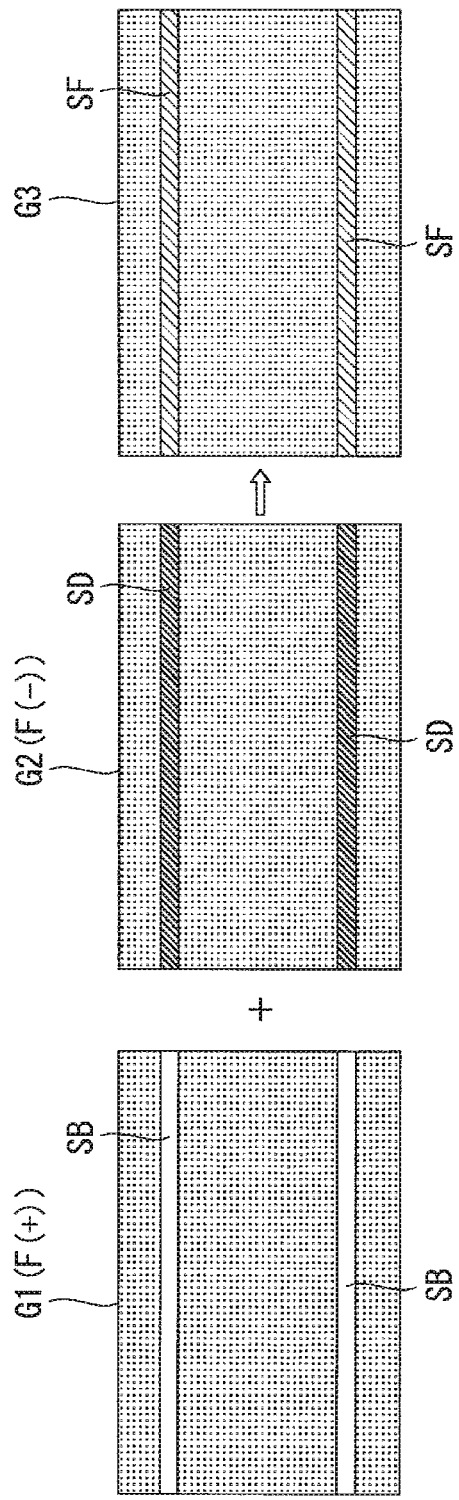
FIG. 5 is a diagram for explanation of an advantage of the projector.

FIG. 5 shows a screen G1 of the + field period F(+) and a screen G2 of the − field period F(−) that are temporally adjacent to each other, and a screen G3 visually recognized when the screen G1 and the screen G2 are continuously displayed at a higher frequency than the above described visible frequency.

As shown in FIG. 5, when the bright streaks SB in the screen G1 of the + field period F(+) and the dark streaks SD in the screen G2 of the − field period F(−) temporally adjacent to each other are generated in the same positions within the screen, the bright streaks SB and the dark streaks SD are cancelled out each other and the streaks appear in average brightness as those in the screen G3. That is, the visibility of the bright streaks SB and the dark streaks SD may be made lower.

In this regard, when the difference of the brightness of the bright streaks SB from the brightness of the horizontal lines around the horizontal lines as the bright streaks SB and the difference of the brightness of the dark streaks SD from the brightness of the horizontal lines around the horizontal lines as the dark streaks SD coincide, the differences in brightness between the horizontal lines as the respective streaks and the horizontal lines around the horizontal lines as the respective streaks are zero and the streaks disappear. However, the degrees of photo leakage are not the same in the + field periods F(+) and the − field periods F(−) of the light modulation devices, and thus, as shown by the screen G3 in FIG. 5, the bright streaks SB and the dark streaks SD are not completely cancelled out, and pale streaks SF are left. As above, the explanation is made with a focus on the first field period F1 and the second field period F2, and the same applies to the relationship between the third field period F3 and the fourth field period F4.

As below, a period containing the first field period F1 and the second field period F2 temporally adjacent to each other is referred to as "first period P1" and a period containing the third field period F3 and the fourth field period F4 temporally adjacent to each other is referred to as "second period P2". That is, the first period P1 contains one first polarity period and one second polarity period adjacent to the one first polarity period. Further, the second period P2 is adjacent to the first period P1 and the second period P2 contains another first polarity period than the above described one first polarity period and another second polarity period than the above described one second polarity period, the another second polarity period being adjacent to this another first polarity period.

Here, in order to make the visual recognition of the pale streaks SF left in the screen G3 in FIG. 5 harder, as shown in FIG. 3, the length t1 of the luminance variation start time in the first period P1 and the length t2 of the luminance variation start time in the second period P2 are set to be different from each other. That is, the timings of switching relating to the drive current are different from each other between the first period P1 and the second period P2. Thereby, the positions in which the pale streaks SF are generated within the screen G3 in the first period P1 and the positions in which the pale streaks SF are generated within the screen G3 in the second period P2 may be made different from each other. Note that the lengths t1, t2 of the luminance variation start times can be adjusted by changing the frequency of the drive current and the phase of the drive current.

As described above, the light source driver 710 drives the first light source 20 and the second light source 10 in synchronization with the drive frequency of the light modulation devices 400R, 400G, 400B, and drives the first light source 20 and the second light source 10 so that the timings of switching relating to the drive current of the first light source 20 and the second light source 10 between the + field period F(+) and the − field period F(−) temporally adjacent to each other may coincide. Further, the timings of switching relating to the drive current are different between the first period P1 and the second period temporally adjacent to each other. The switching relating to the drive currents in the embodiment refers to changes of the value of the drive current corresponding to the variations of the light source luminance shown in FIG. 3. In the embodiment, the drive control may be executed on at least one of the first light source 20 and the second light source 10.

That is, the method of driving the projector 1 of the embodiment includes applying the voltage having polarity inverting according to the predetermined drive frequency to the light modulation devices 400R, 400G, 400B and alternately providing the first polarity period F (+) in which the polarity of the voltage is the first polarity and the second polarity period F (−) in which the polarity of the voltage is the second polarity to drive the light modulation devices 400R, 400G, 400B, and driving the first light source 20 and the second light source 10 so that the timings of switching relating to the drive current may coincide between the first polarity period and the second polarity period temporally adjacent to the first polarity period, wherein the timings of switching are different from each other between the first period P1 and the second period P2. The first period P1 contains one first polarity period and one second polarity period temporally adjacent to the one first polarity period. And the second period P2 is temporally adjacent to the first period P1 and contains another first polarity period than the one first polarity period and another second polarity period than the one second polarity period, the another second polarity period being adjacent to the another first polarity period.

As described above, according to the projector 1 of the embodiment, the bright streaks SB and the dark streaks SD are displayed in the same positions on the respective screens in the + field period F(+) and the − field period F(−) temporally adjacent to each other so that the bright streaks SB and the dark streaks SD may be superimposed and cancelled out each other into the pale streaks SF, and additionally, the luminance variation start times are made different between the first period P1 and the second period P2 respectively containing the + field period F(+) and the − field period F(−) and being temporally adjacent to each other, and thus, the positions in which the pale streaks S are generated within the screen may be temporally changed. Thereby, the projector 1 with which visual recognition of the horizontal-striped unevenness of brightness by the user is harder may be realized. Further, it is only necessary to synchronize the drive currents of the first light source 20 and the second light source 10 with the vertical synchronizing signal Vsync, and the control by the control unit 730 is not complicated.

Note that FIG. 3 only shows the four field period F4 and the previous field periods, however, regarding the third period including the subsequent fifth field period and sixth field period, a luminance variation start time having a length different from the length t2 of the luminance variation start time in the second period P2, but the same as the length t1 of the luminance variation start time in the first period P1 may be set. Or, regarding the third period, a luminance variation start time having a length different from the length t1 of the luminance variation start time in the first period P1, but the same as the length t2 of the luminance variation start time in the second period P2 may be set. As described above, three or more types of luminance variation start times are set, and thereby, visual recognition of the horizontal-striped unevenness of brightness may be made harder.

Second Embodiment

As below, a second embodiment of the invention will be explained using FIG. 6.

The basic configuration of a projector of the second embodiment is the same as that of the first embodiment, but the drive method is different from that of the first embodiment. Accordingly, the explanation of the whole projector will be omitted and only the drive method will be explained.

Figure 6:
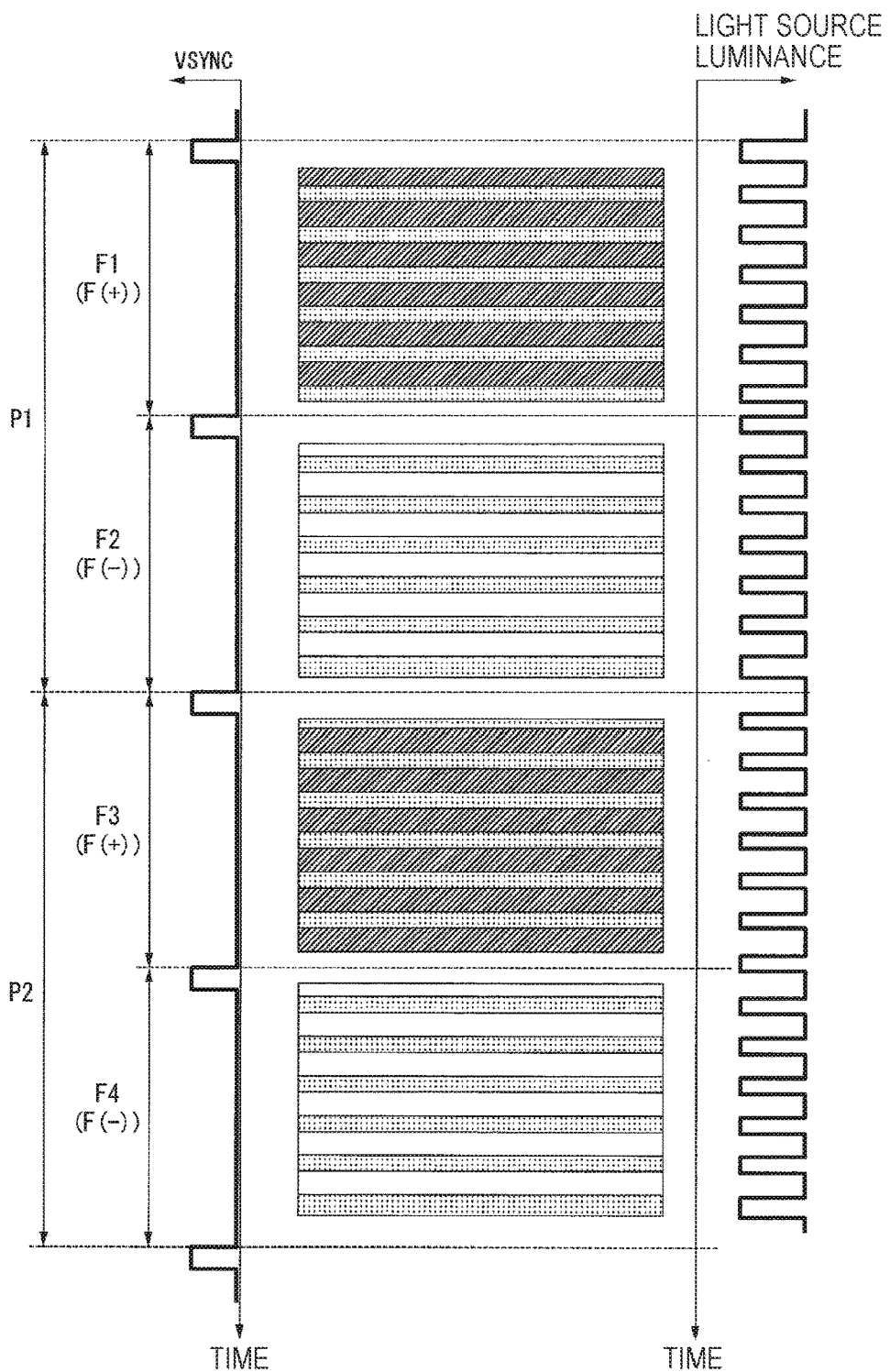
FIG. 6 is a diagram for explanation of a method of driving a projector of the second embodiment.

FIG. 6 is a diagram for explanation of a method of driving the projector of the embodiment. In FIG. 6, the common component elements to the drawings used in the first embodiment have the same signs and the explanation thereof will be omitted.

In the embodiment, the drive frequency of the light modulation devices 400R, 400G, 400B is 120 Hz and the length of one vertical synchronizing period (field period) is about 8.3 msec. Further, the light source driver 710 drives the first light source 20 and the second light source 10 by PWM control. The duty ratio of on/off of the drive current supplied to the first light source 20 and the second light source 10 is 50%. Note that, as will be described later, the duty ratio of on/off of the drive current is not limited to 50%, but can be changed as appropriate.

In the embodiment, as is the case of the first embodiment, the light source driver 710 drives the first light source 20 and the second light source 10 in synchronization with the drive frequency of the light modulation devices 400R, 400G, 400B. That is, as shown in FIG. 6, the waveform of the drive current of the first light source 20 and the second light source 10 is controlled in synchronization with the pulses of the vertical synchronizing signal Vsync.

Specifically, the light source driver 710 synchronizes the rise of the pulse of the vertical synchronizing signal Vsync with the fall of the variation of the light source luminance (the fall of the waveform of the drive current) in the first field period F1 (+ field period F(+)) of the first period P1. Then, the drive current repeats on/off at the duty ratio of 50%.

Then, the light source driver 710 synchronizes the rise of the pulse of the vertical synchronizing signal Vsync corresponding to the start of the second field period F2 (− field period F(−)) with the fall of the variation of the light source luminance (the fall of the waveform of the drive current) in the first period P1. In other words, the light source driver 710 sets the waveform of the drive current in the second field period F2 so that the phase of the drive current in the second field period F2 may coincide with the phase of the drive current in the first field period F1 with the rise of the pulse of the vertical synchronizing signal Vsync as a trigger.

Then, the light source driver 710 sets the waveform of the drive current in the third field period F3 so that the phase of the drive current in the third field period F3 may be different by 180° from the phase of the drive current in the first field period F1 and the phase of the drive current in the second field period F2 with the rise of the pulse of the vertical synchronizing signal Vsync as a trigger. Then, the drive current repeats on/off at the duty ratio of 50%.

Then, the light source driver 710 sets the waveform of the drive current in the fourth field period F4 so that the phase of the drive current in the fourth field period F4 may coincide with the phase of the drive current in the third field period F3 with the rise of the pulse of the vertical synchronizing signal Vsync as a trigger.

That is, the phase of the drive current in the first period P1 and the phase of the drive current in the second period P2 are different by 180 degrees. In other words, in the waveform of the drive current, all of the timings of switching from on to off of PWM drive in the first period P1 and the timings of switching from off to on of PWM drive in the second period P2 coincide between the first period P1 and the second period P2. According to the configuration, the light source driver may easily control the drive currents.

Note that not all of the timings of switching from on to off of PWM drive in the first period P1 and the timings of switching from off to on of PWM drive in the second period P2 may coincide, but part of the timings may be different.

As described above, the light source driver 710 drives the first light source 20 and the second light source 10 in synchronization with the drive frequency of the light modulation devices 400R, 400G, 400B, and drives the first light source 20 and the second light source 10 so that the timings of switching relating to the drive current of the first light source 20 and the second light source 10 between the first polarity period F(+) and the second polarity period F(−) temporally adjacent to each other may coincide and the timings of switching relating to the drive current may be different between the first period P1 and the second period P2 temporally adjacent to each other. The switching relating to the drive current in the embodiment refers to switching between on/off in the PWM drive.

In the embodiment, as is the case of the first embodiment, the horizontal line in which luminance information is written with the higher light source luminance is displayed more darkly than the other horizontal lines in the + field period F(+) and the horizontal line in which luminance information is written with the higher light source luminance is displayed more lightly than the other horizontal lines in the − field period F(−). Therefore, in FIG. 6, for example, in the first field period F1 of the first period P1, the horizontal lines with normal brightness and the lighter horizontal lines are alternately and repeatedly located from the top to bottom of the screen. On the other hand, in the second period F2 of the first period P1, the horizontal lines with normal brightness and the darker horizontal lines are alternately and repeatedly located from the top to bottom of the screen. The same applies to the third field period F3 and the fourth field period F4 in the second period P2. As described above, the bright streaks SB and dark streaks SD are generated in the same positions on the respective screens between the field periods temporally adjacent to each other, and the bright streaks SB and dark streaks SD are cancelled out each other and average brightness appears.

Here, as a comparative example, a projector without a phase difference of the drive current between the first period P1 and the second period P2 temporally adjacent to each other is assumed, and a problem will be explained using FIG. 8.

Figure 8:
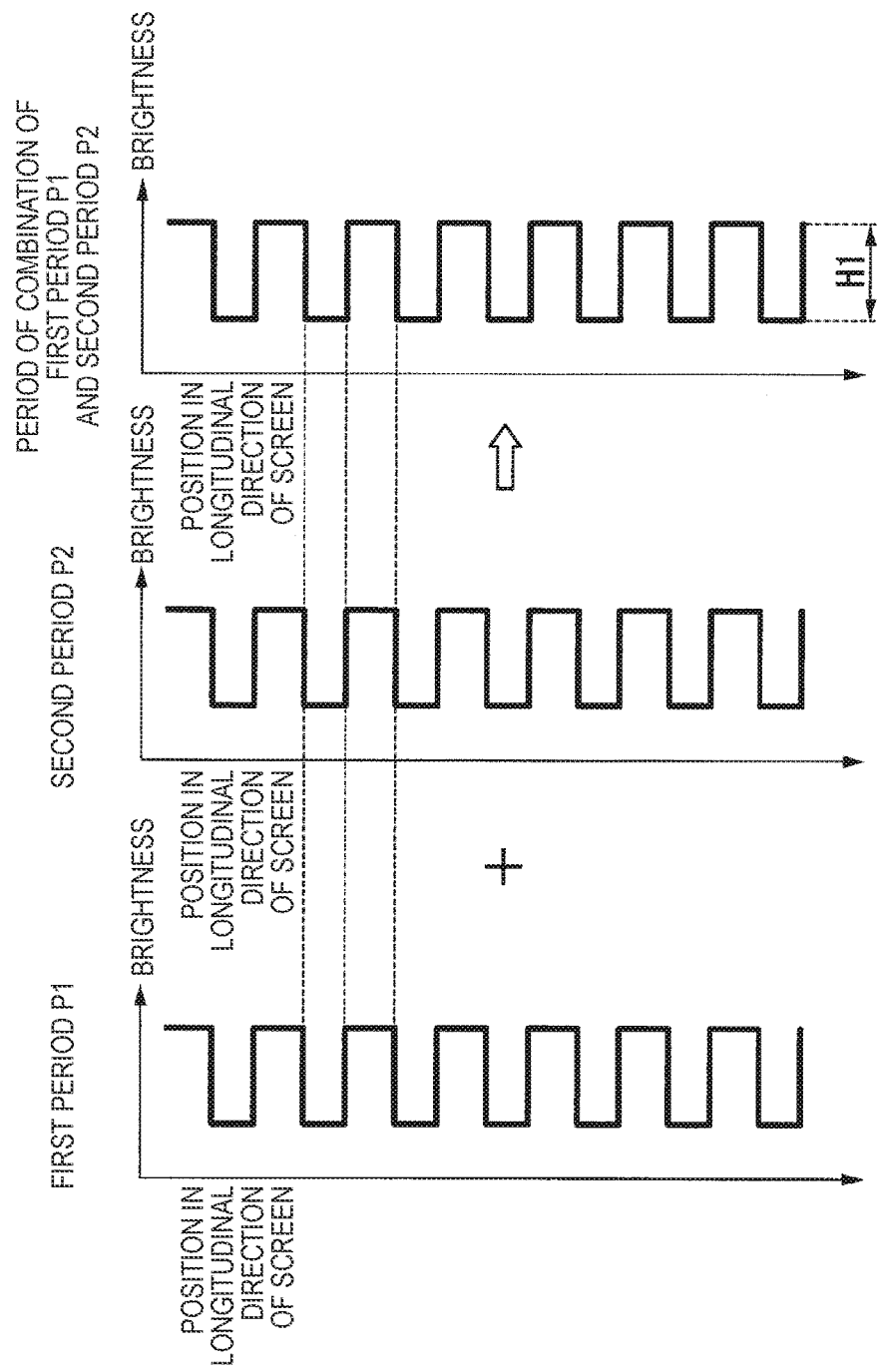
FIG. 8 is a diagram for explanation of a problem of a projector of a comparative example.

The drawing on the left end in FIG. 8 shows unevenness of brightness as a result of cancelling out of the streaks in the screen within the first period P1. The drawing at the center in FIG. 8 shows unevenness of brightness as a result of cancelling out of the streaks in the screen within the second period P2. The drawing on the right end in FIG. 8 shows unevenness of brightness recognized as a result of the combination of the first period P1 and the second period P2. In all of the drawings in FIG. 8, the longitudinal axis indicates the position in the vertical direction of the screen (the position of the horizontal line) and the lateral axis indicates brightness.

In the projector of the comparative example, as shown in FIG. 8, the phase of the drive current is not made different between the first period P1 and the second period P2 temporally adjacent to each other, and thus, the positions of the horizontal lines as the pale streaks SF in the screen in the first period P1 and the positions of the horizontal lines as the pale streaks SF in the screen in the second period P2 are superimposed between the first period P1 and the second period P2. That is, the unevenness of brightness (brightness distribution) in the position in the longitudinal direction of the screen in the first period P1 and the unevenness of brightness (brightness distribution) in the position in the longitudinal direction of the screen in the second period P2 coincide. Therefore, as shown in the drawing on the right end in FIG. 8, the unevenness of brightness is not cancelled out each other but left in the period of the combination of the first period P1 and the second period P2.

Figure 7:
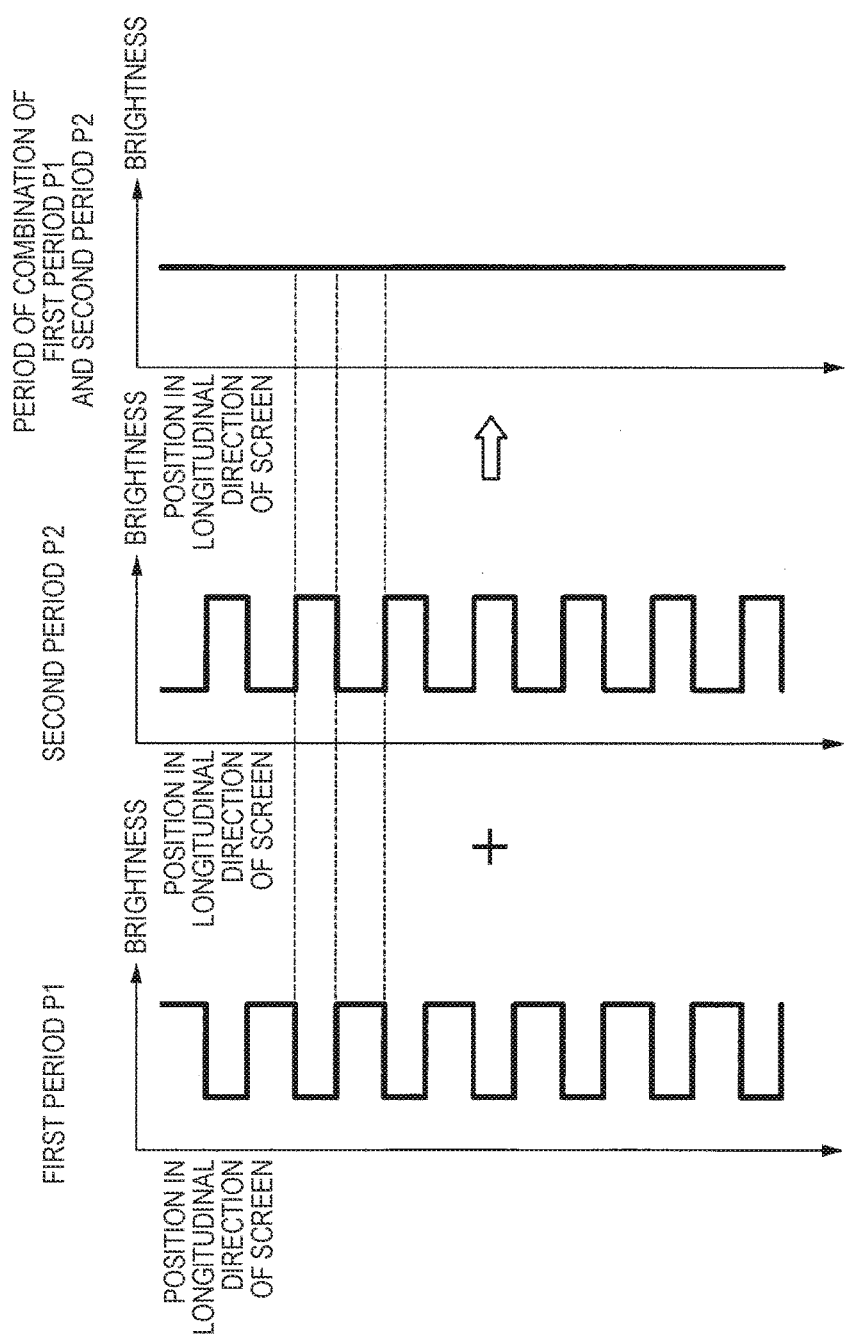
FIG. 7 is a diagram for explanation of an advantage of the projector of the second embodiment.

On the other hand, FIG. 7 shows an advantage of the projector 1 of the embodiment. The meaning of the respective drawings in FIG. 7 and the longitudinal axes and the lateral axes are the same as those described above in FIG. 8.

In the projector 1 of the embodiment, as shown in FIG. 7, the phase of the drive current is different between the first period P1 and the second period P2 by 180 degrees, and the positions of the horizontal lines as the pale streaks SF in the screen in the first period P1 and the positions of the horizontal lines as the pale streaks SF in the screen in the second period P2 are not superimposed between the first period P1 and the second period P2. In addition, the positions of the horizontal lines as the pale streaks SF in the screen in the first period P1 and the positions of the horizontal lines not the pale streaks SF in the screen in the second period P2 coincide, and further, the positions of the horizontal lines not the pale streaks SF in the screen in the first period P1 and the positions of the horizontal lines as the pale streaks SF in the screen in the second period P2 coincide. As a result, as shown by the drawing on the right end in FIG. 7, the unevenness of brightness is nearly completely cancelled out each other and almost eliminated in the period of the combination of the first period P1 and the second period P2.

As described above, according to the embodiment, the projector 1 with which visual recognition of the horizontal-striped unevenness of brightness by the user is harder may be realized. Particularly, the duty ratio of on/off in the PWM drive is 50% and the phase of the drive current is different between the first period P1 and the second period P2 by 180 degrees, and thereby, as shown in FIG. 7, recognition of streaky unevenness may be made harder most effectively.

In the embodiment, the example with the duty ratio in the PWM drive of 50% is shown, however, the duty ratio is not necessarily 50%. As an example, FIG. 9 shows an advantage of a projector with the duty ratio set to 30% as an example.

Figure 9:
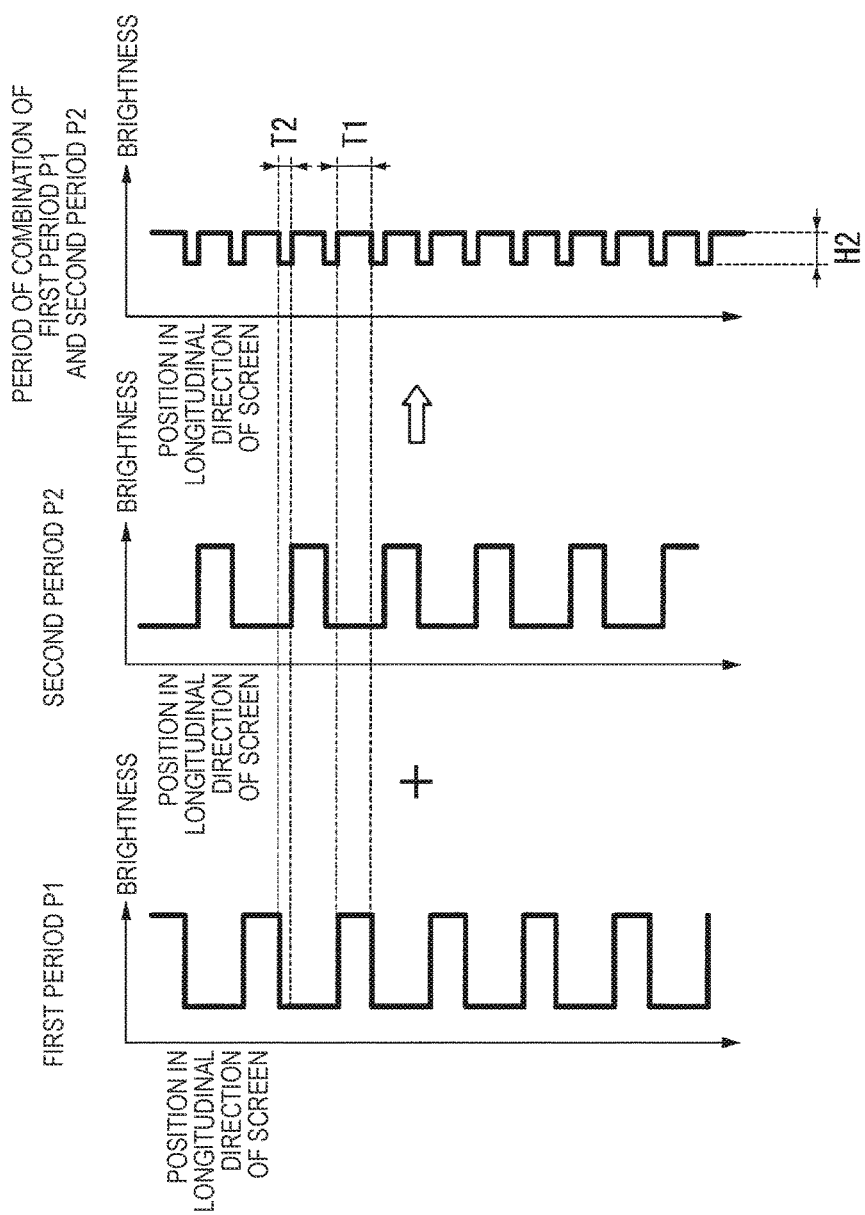
FIG. 9 is a diagram for explanation of an advantage of a projector of a modified example.

The meaning of the respective drawings in FIG. 9 and the longitudinal axes and the lateral axes are the same as those described above in FIG. 8.

As shown by the drawing on the right in FIG. 9, when the duty ratio is set to 30%, a period T2 in which unevenness of brightness is not cancelled out each other is present in the period of the combination of the first period P1 and the second period P2, and the unevenness of brightness is left. On the other hand, a period T1 in which unevenness of brightness is cancelled out each other is present and a difference in brightness H2 between the bright streak SB and the dark streak is smaller than a difference in brightness H1 of the comparative example (see FIG. 8) without the phase difference of the drive current by 180 degrees between the first period P1 and the second period P2. In this manner, the unevenness of brightness may be improved.

Third Embodiment

As below, a third embodiment of the invention will be explained using FIG. 10.

The basic configuration of a projector of the third embodiment is the same as that of the first embodiment, but the driving method is different from that of the first embodiment. Accordingly, the explanation of the whole projector will be omitted and only the driving method will be explained.

Figure 10:
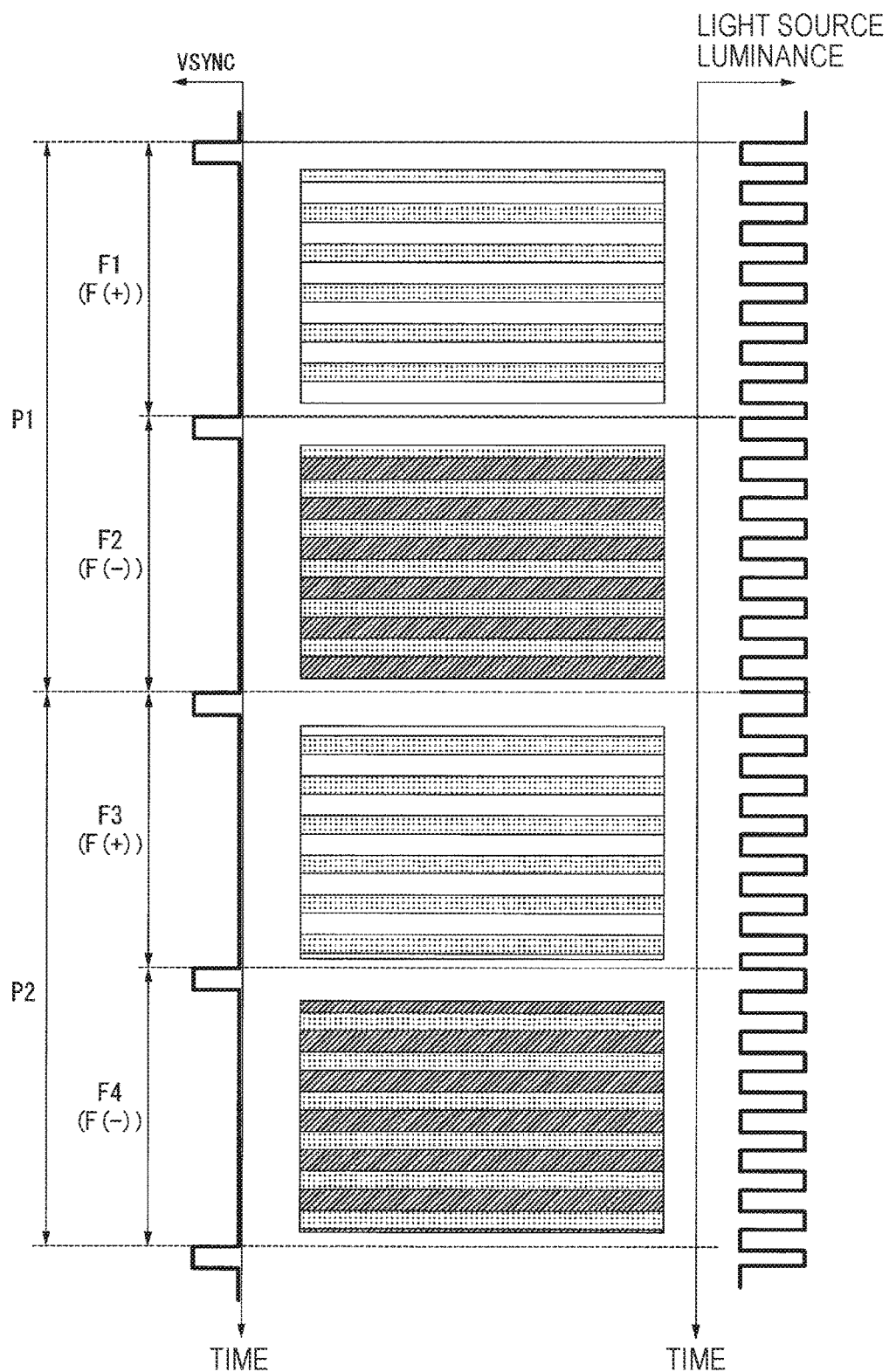
FIG. 10 is a diagram for explanation of a method of driving a projector of the third embodiment.

FIG. 10 is a diagram for explanation of a method of driving the projector of the embodiment. In FIG. 10, the common component elements to the drawings used in the first embodiment have the same signs and the explanation thereof will be omitted.

In the embodiment, the drive frequency of the light modulation devices 400R, 400G, 400B is 120 Hz and the length of one vertical synchronizing period (field period) is about 8.3 msec. Further, the light source driver 710 drives the first light source 20 and the second light source 10 by PWM control. The duty ratio of on/off of the drive current is 30%.

In the embodiment, as is the case of the first embodiment, the light source driver 710 drives the first light source 20 and the second light source 10 in synchronization with the drive frequency of the light modulation devices 400R, 400G, 400B. That is, as shown in FIG. 10, the waveform of the drive current of the first light source 20 and the second light source 10 is controlled in synchronization with the pulses of the vertical synchronizing signal Vsync.

Specifically, the light source driver 710 synchronizes the rise of the pulse of the vertical synchronizing signal Vsync with the fall of the variation of the light source luminance (the fall of the waveform of the drive current, i.e., switching from on to off) in the first field period F1 (+ field period F(+)) of the first period P1.

Then, the light source driver 710 synchronizes the rise of the pulse of the vertical synchronizing signal Vsync corresponding to the start of the second field period F2 (− field period F(−)) of the first period P1 with the fall of the variation of the light source luminance (the fall of the waveform of the drive current, i.e., switching from on to off).

Then, the light source driver 710 synchronizes the rise of the pulse of the vertical synchronizing signal Vsync with the rise of the variation of the light source luminance (the rise of the waveform of the drive current, i.e., switching from off to on) in the third field period F3 (+ field period F(+)) of the second period P2.

Then, the light source driver 710 synchronizes the rise of the pulse of the vertical synchronizing signal Vsync corresponding to the start of the fourth field period F4 (− field period F(−)) of the second period P2 with the rise of the variation of the light source luminance (the rise of the waveform of the drive current, i.e., switching from off to on).

As described above, in the embodiment, the light source driver 710 switches between synchronization with the fall of the waveform of the drive current and synchronization with the rise of the waveform of the drive current of the pulse of the vertical synchronizing signal Vsync between the first period P1 and the second period P2, i.e. with respect to each of the two field periods. That is, the light source driver 710 synchronizes the start of one first polarity period and switching relating to the drive current in the first period P1 and synchronizes the start of the another first polarity period and switching relating to the drive current in the second period P2. One switching of the switching of synchronization with the start of one first polarity period and the switching of synchronization with the start of the another first polarity period is switching from on to off in the pulse width modulation drive of the drive current and the other switching is switching from off to on in the PWM drive.

Figure 11:
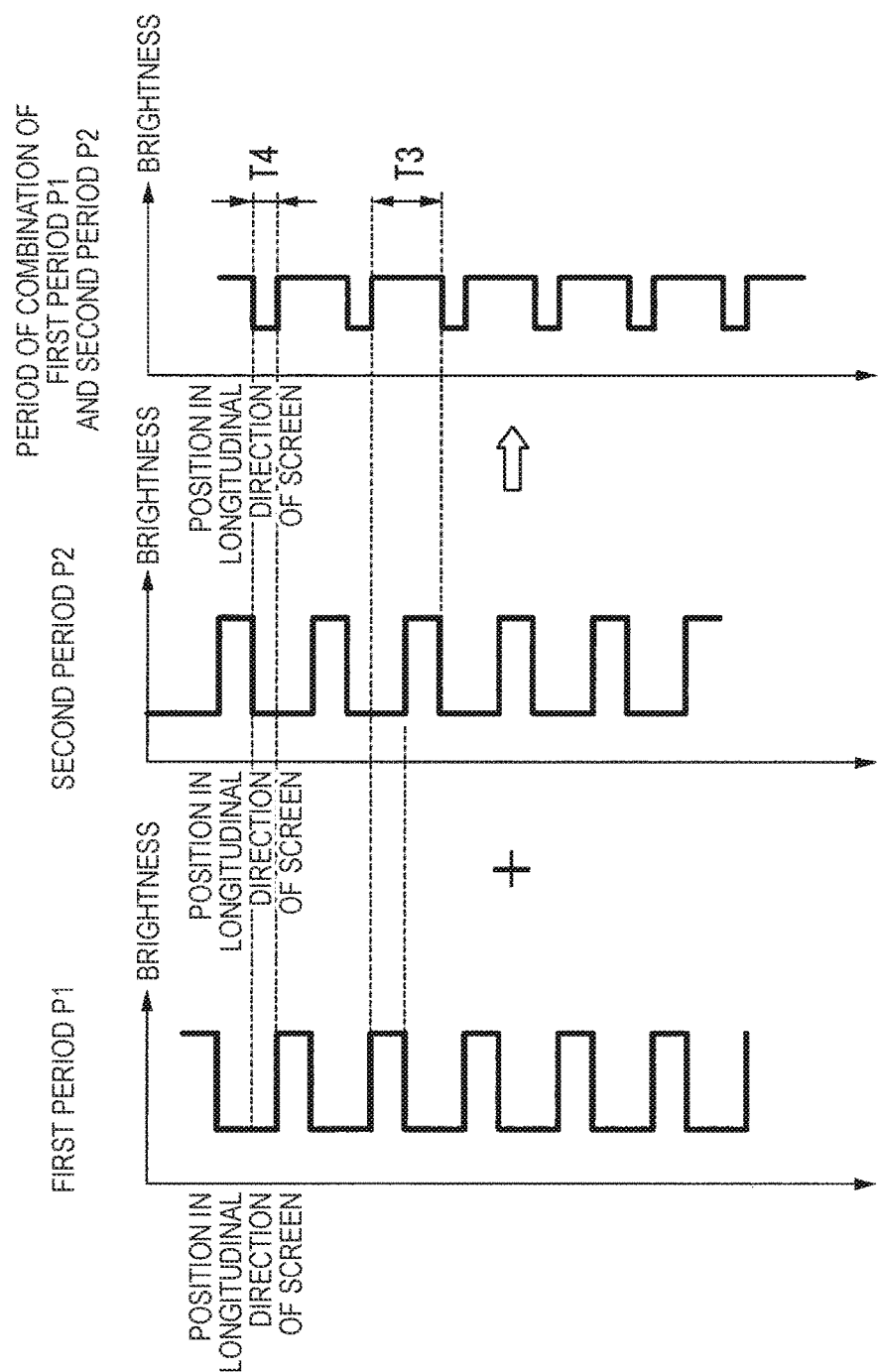
FIG. 11 is a diagram for explanation of an advantage of the projector of the third embodiment.

FIG. 11 shows an advantage of the projector of the embodiment.

The meaning of the respective drawings in FIG. 11 and the longitudinal axes and the lateral axes are the same as those described above in FIG. 8.

As shown by the drawing on the right in FIG. 11, the duty ratio is 30% in the embodiment, and thus, as it the case of the second embodiment, a period T4 in which unevenness of brightness is not cancelled out each other is present in the period of the combination of the first period P1 and the second period P2, and the unevenness of brightness is left. On the other hand, a period T3 in which unevenness of brightness is cancelled out each other is present and the unevenness of brightness may be improved compared to the case without switching of the synchronization of one of fall and rise of variation of the light source luminance (one of fall and rise of the waveform of the drive current) at the start of the respective periods of the first period P1 and the second period P2.

Note that the technical scope of the invention is not limited to the above described embodiments, but various changes can be made without departing from the scope of the invention.

In the above described embodiments, the example of the projector using the light source of the solid-state light source such as a semiconductor laser element is explained, however, in place of the configuration, a light source of e.g. a discharge lamp such as an ultrahigh pressure mercury lamp may be used. In this case, the timings of switching relating to the drive current to be coincide between the first polarity period and the second polarity period temporally adjacent to each other and different between the first period and the second period temporally adjacent to each other may be timings of polarity inversion of the alternating current supplied to the discharge lamp. The luminance of the discharge lamp varies at the polarity inversion, and the projector with which visual recognition of horizontal-striped unevenness of brightness is harder may be realized by application of the invention.

Further, in the above described embodiments, the example in which the first period P1 and the second period P2 respectively contain the two field periods is explained, however, in place of the configuration, the first period and the second period may respectively contain three or more field periods. For example, the case where the first period contains four field periods (first to fourth field periods) is considered. For example, the first field period and the third field period are set to + field periods and the second field period and the fourth field period are set to − field periods. In this case, timings of switching relating to the drive current may coincide in all of the first to fourth field periods, and unevenness of brightness may be cancelled out each other in the respective combination of the first field period and second field period and the third field period and fourth field period. In the configuration, the timings of switching relating to the drive current may be made different between the fourth field period located at the tail in the first period and the fifth field period located at the head of the second period.

Furthermore, in the above described embodiments, the timings of switching relating to the drive current may coincide in the two field periods temporally adjacent to each other, and thereby, unevenness of brightness may be cancelled out each other between the two field periods temporally adjacent to each other. However, in place of the configuration, the timings of switching relating to the drive current may coincide in the two field periods not temporally adjacent to each other, and thereby, unevenness of brightness is cancelled out each other between the two field periods not temporally adjacent to each other. Or, for example, the timings of switching relating to the drive current may coincide in the first field period and the fourth field period and unevenness of brightness may be cancelled out each other. In this case, it is desirable to cancel out the unevenness of brightness within a higher frequency range than about 50 Hz as a visible frequency (in terms of time, about 20 msec or less) at which the human eye senses flicker.

For example, in the above described embodiments, the example of applying the invention to the transmissive-type projector is explained, however, the invention can be applied to a reflective-type projector. Here, "transmissive-type" refers to a type of liquid crystal light valves including liquid crystal panels transmitting light. "Reflective-type" refers to a type of liquid crystal light valves reflecting light. Note that the light modulation device is not limited to the liquid crystal panel or the like, but may be a light modulation device using e.g. a digital micromirror device.

In the above described embodiments, the example of the projector using the three liquid crystal panels is taken, however, the invention can be applied to a projector using only a single liquid crystal panel or a projector using four or more liquid crystal panels.

The entire disclosure of Japanese Patent Application No. 2017-184525, filed Sep. 26, 2017 and No. 2018-032462, filed Feb. 26, 2018 and No. 2018-076346, filed Apr. 11, 2018 are expressly incorporated by reference herein.

What is claimed is:

1. A projector comprising:
   a light source configured to emit light;
   a light modulation device configured to modulate the light emitted from the light source according to an image signal;
   a projection optical device configured to project the light modulated by the light modulation device;
   a first driver configured to apply a voltage to the light modulation device and drive the light modulation device, the voltage having polarity inverted according to a predetermined drive frequency; and
   a second driver configured to supply a drive current to the light source and drive the light source in synchronization with the predetermined drive frequency,
   wherein the first driver is configured to drive the light modulation device to alternately provide a first polarity period in which the polarity of the voltage is first polarity and a second polarity period in which the polarity of the voltage is second polarity different from the first polarity,
   wherein the second driver is configured to drive the light source so that timings of switching related to the drive current coincide between the first polarity period and the second polarity period adjacent to the first polarity period, and
   wherein the timings of switching are different from each other between a first period and a second period,
      the first period containing one first polarity period and one second polarity period adjacent to the one first polarity period,
      the second period being adjacent to the first period, and the second period containing another first polarity period than the one first polarity period and another second polarity period than the one second polarity period, the another second polarity period being adjacent to the another first polarity period.

2. The projector according to claim 1,
   wherein the light source is a solid-state light source, and
   wherein the switching is switching of on/off in pulse width modulation drive of the drive current supplied to the solid-state light source.

3. The projector according to claim 2,
   wherein phase of the drive current in the second period is shifted from phase of the drive current in the first period by 180 degrees.

4. The projector according to claim 3,
   wherein a duty ratio of on/off in the pulse width modulation drive of the drive current is 50%.

5. The projector according to claim 2,
   wherein the second driver synchronizes a start of the one first polarity period and a switching in the drive current in the first period and synchronizes a start of the another first polarity period and a switching in the drive current in the second period,
   wherein one switching of the switching of synchronization with the start of the one first polarity period and the switching of synchronization with the start of the another first polarity period is a switching from on to off in the pulse width modulation drive, and
   wherein the other switching is a switching from off to on in the pulse width modulation drive.

6. The projector according to claim 1,
   wherein the light source is a discharge lamp, and
   wherein the switching is polarity inversion of an alternating current supplied to the discharge lamp.

7. A method of driving a projector including a light source configured to emit light, and a light modulation device configured to modulate the light emitted from the light source according to an image signal, comprising:
   applying a voltage to the light modulation device, the voltage having polarity inverted according to a predetermined drive frequency, and driving the light modulation device;
   supplying a drive current to the light source and driving the light source in synchronization with the predetermined drive frequency;
   providing a first polarity period in which the polarity of the voltage is first polarity and a second polarity period in which the polarity of the voltage is second polarity different from the first polarity are alternately provided and driving the light modulation device; and
   driving the light source so that timings of switching related to the drive current coincide between the first polarity period and the second polarity period adjacent to the first polarity period,
   wherein the timings of switching are different from each other between a first period and a second period,
      the first period containing one first polarity period and one second polarity period adjacent to the one first polarity period,
      the second period being adjacent to the first period, and the second period containing another first polarity period than the one first polarity period and another second polarity period than the one second polarity period, the another second polarity period being adjacent to the another first polarity period.

* * * * *